2,904,472
Patented Sept. 15, 1959

2,904,472

PROCESS FOR DEGRADATION OF SIDE CHAIN OF ANDROSTANE AND PREGNANE COMPOUNDS

Albert Wettstein and Ernst Vischer, Basel, Switzerland, assignors to Ciba Pharmaceutical Products, Inc., Summit, N.J.

No Drawing. Application August 10, 1954
Serial No. 449,008

Claims priority, application Switzerland August 21, 1953

19 Claims. (Cl. 195—51)

This invention relates to a new process for the manufacture of steroidal oxidation products of the steroid series, especially for the degradation of the side chains of pregnane compounds and for the manufacture of unsaturated compounds of the andostane series by a biochemical method, for example, such compounds as $\Delta^{1:4}$-androstadiene-3:17-dione, testolosone, 1:2-dehydrotestolactone, $\Delta^5$- androstene-3β-ol-17-one, and androstane-3:17-dione.

According to the process of the invention saturated or unsaturated compounds of the androstane or pregnane series, which contain in the 3-, 17- and 3-, 20-positions respectively a free or protected hydroxyl or oxo group, are subjected to the action of a culture of fungi of the species *Fusarium solani, Fusarium caucasicum, Rhizopus suinus, Venturia chlorospora* and *Venturia linicerae* or of enzymes obtainable therefrom and the oxidation products isolated, which belong to the androstane series and which are oxidized in at least one of the rings A and D.

Media which are known per se for this purpose, are suitable for the cultivation of the fungi. The media may contain for example sugars, such as glucose or lactose,. peptones, corn steep liquor, soya products and the like and also mineral salts. Synthetic nutrient solutions may also be used. The fermentation is conducted especially under aerobic conditions, for example, in agitated cultures or by submerged growth with stirring and supply of air. The eumycetes are distinguished from other micro-organisms, for example the bacteria, by good growth in relatively simple nutrient media. The reaction of the process of this invention takes place in the cultures of fungi or with the aid of the enzymes obtainable therefrom, if desired, concentrated or separated, that is to say, in the simplest case, in a suspension of the separated or homogenized fungus mycelium, or in filtrates or aqueous extracts thereof.

As starting materials for the new process there are used saturated or unsaturated compounds of the pregnane and androstane series, for example, progesterone, 11-dehydroprogesterone, 11-keto-progesterone, 11-, 12- or 14-hydroxy-progesterones, $\Delta^5$- or $\Delta^4$-pregnene-3-ol-20-ones, $\Delta^5$-pregnene-3:20-diols, 11-desoxy-corticosterone, corticosterone, 11-dehydro-corticosterone, $\Delta^4$- or $\Delta^5$-androstene-3:17-dione, testosterone, $\Delta^5$ - androstene - 3 - ol-17-one, adrenosterone, pregnane-3:20-dione, pregnane-3-ol-20-one androstane-3:17-dione, allopregnane-3:20-dione, 3β-acetoxy-allo-pregnane-20-one and corresponding compounds with protected hydroxyl or oxo groups. The protected hydroxyl group in the starting materials may be, for example, a hydroxyl group esterified with an aliphatic, aromatic or heterocyclic carboxylic acid, for example acetic acid, propionic acid, benzoic acid or furane carboxylic acid, or an etherified hydroxyl group, for example the tetrahydro-pyranyloxy-, benzyl-oxy- or triphenyl-methoxy-group. The protected oxo group is advantageously a ketalized oxo group, especially derived from a dihydric alcohol, such as the ethylene dihydroxy group. The starting materials may contain double bonds, for example, in the 4-, 5-, 6-, 7-, 8-, 9:11, 11- or 14-position, or additional substituents, such as free or protected hydroxyl, oxo or carboxyl groups, furthermore epoxy groups or halogen atoms, for example in 4-, 5-, 6-, 7-, 8-, 9-, 11-, 12-, 14-, 15- or 21-position. The starting materials are of any desired steric configuration and also include those of the so-called nor- and/or homo-series. The process can also be carried out with mixtures of substances which contain one or more of the above specified starting materials. Thus, for example, starting from the neutral portion formed in the oxidation of cholesterol, especially after subsequent dehydrogenation of the 3-hydroxyl group, there is obtained, among other products, the $\Delta^{1:4}$-androstadiene-3:17-dione.

The isolation and purification of the products of this process can be carried out according to known methods. Their isolation can take place, for example, by extraction of the reaction mixture with a suitable organic solvent, for example methylene chloride or ethyl acetate. For the further purification of the extract thus obtained there are especially suitable chromatography, for example over aluminum oxide or silica gel, application of distribution methods, for example, the countercurrent process, or separation by means of Girard reagents, such as trimethyl ammonium- or pyridinium acetic acid hydrazide. Instead of or in addition to such purification it is preferable to recrystallize from organic or aqueous organic solvents.

By means of the new biochemical process, for example, progesterone, and also $\Delta^5$-pregnene-3β-ol-20-one, 11-desoxy-corticosterone, or $\Delta^4$-androstene-3:17-dione, using for example, fungi of the genus Fusarium such as *Fusarium solani* or *Fusarium caucasicum,* can be converted in a single operation and with high yield into $\Delta^{1:4}$-androstadiene-3:17-dione. This conversion is only possible chemically in a multi-stage process with considerably lower total yield. The specified reaction product constitutes an important starting material for the synthesis of esterone, which is obtainable therefrom in, a single process step, consisting in aromatization of ring A by heating with a high boiling solvent according to the method claimed by Inhoffen in U.S. Pat. 2,361,847 (1944) and also described in Angew. Chem. 59, 207 (1947). From the pregnane compounds containing in the 3-position a free or protected hydroxyl or oxo group and saturated in the 4:5- and 5:6-positions there can be obtained depending on the period of incubation the corresponding saturated 17-ketones or their derivatives dehydrogenated in the ring A, for example, $\Delta^{1:4}$-androstadiene-3:17-diones. In an analogous manner there are obtained from the corresponding saturated androstane compounds derivatives thereof dehydrogenated in the ring A. From progesterone, $\Delta^{1:4}$-androstadiene-3:17-dione and from the other starting materials just mentioned, by prolonged incubation, namely, about 6–15 days, 1:2-dehydro-testolactone of the formula

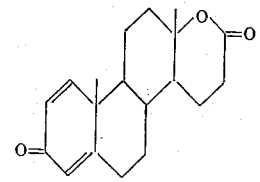

is obtained melting at 219–220° C. and having the specific rotation $[\alpha]_D^{22}=-49\pm3°$ (c.=1.025 in chloroform). It exhibits also in the ultraviolet spectrum a strong band at 242 m$\mu$ (log $\epsilon$=4.23) and contains about 75.7% of carbon and 8.05% of hydrogen (calculated for $C_{19}H_{24}O_3$: C, 75.97%; H, 8.05%). Using cultures of other fungi, for example Phycomycetes, instead of the 1:2-dehydro-testolactone there is obtained the known testolactone.

The products of the invention are useful as medicaments and more particularly as intermediate products for the manufacture of medicaments, especially for the manufacture of estrone.

The following examples illustrate the invention:

Example 1

4 liters of a nutrient solution consisting of 30 cc. of corn steep liquor, 50 gms. of peptone, 200 mg. of crude glucose and tap water, is uniformly divided among 13 conical flasks each of one liter capacity and the whole sterilized. The pH of these solutions amounts to 6.4. They are inoculated with a culture of the fungus *Fusarium solani* and mechanically agitated at 25° C. After 48 hours the fungus has considerably grown. There is distributed among the 13 flasks, under sterile conditions, a solution of 1.0 gm. of progesterone in 45 cc. of acetone. Shaking is continued for a further 48 hours at the above temperature followed by filtration from the mycelium. The pH of the culture filtrate now amounts to 7.9. The solution is extracted by shaking with one portion of 1500 cc., two portions each of 1000 cc. and finally with two portions each of 500 cc. of methylene chloride. The extract is washed with two portions each of 300 cc. of 0.1 N hydrochloric acid, two portions each of 300 cc. of 1% sodium bicarbonate solution and three portions each of 300 cc. of water, dried over sodium sulfate and evaporated under vacuum. The partially crystalline residue (1.14 gms.) is chromatographed on a column of 30 gms. of aluminum oxide in benzene-petroleum ether (3:2) by fractional elution.

The benzene-petroleum ether and benzene eluates are combined and crystallized from a mixture of acetone and petroleum ether, whereby colorless, rhombic plates are obtained of melting point 145–146° C.; $[\alpha]_D = +110° \pm 4°$ (chloroform), $+112° \pm 4°$ (alcohol). The substance proved to be uniform when paper-chromatographically tested according to the technique of R. B. Burton, A. Zaffaroni and E. H. Keutmann, J. Biol. Chem. 188, 763 (1951) (compare also R. Neher and A. Wettstein, Helv. Chim, Acta 35, 276 (1952)). This compound is the known $\Delta^{1:4}$-androstadiene-3:17-dione. Yield about 80%.

If instead of the progesterone solution a solution of 1 gm. of 11-desoxy-corticosterone or of 1 gm. of $\Delta^4$-androstene-3:17-dione in 45 cc. of acetone is subjected to the action of a similar culture of *Fusarium solani*, and if the culture is treated in the above described manner and worked up, $\Delta^{1:4}$-androstadiene-3:17-dione is likewise obtained in high yield.

By replacing in the above example the culture of *Fusarium solani* by a culture of *Fusarium caucasicum* prepared on a similar nutrient medium, progesterone is converted into $\Delta^{1:4}$-androstadiene-3:17-dione with similar high yield.

Example 2

To 4 liters of a culture of *Fusarium solani*, prepared as described in Example 1, there is added under sterile conditions a solution of 1.0 gm. of $\Delta^5$-pregnene-3$\beta$-ol-20-one in 37 cc. of methanol. The culture is shaken for a further 48 hours at 26° C., the mycelium thereupon filtered off and the culture filtrate extracted with methylene chloride as described in Example 1.

The extraction residue is dissolved in a mixture of benzene-petroleum ether (8:2) and chromatographed on a column of 30 gms. of aluminum oxide by fractional elution. The first benzene-petroleum ether fractions are combined (about 140 mg.) and crystallized from a mixture of acetone and petroleum ether. The rhombic plates obtained, of melting point 145–146° C. constitute of $\Delta^{1:4}$-androstadiene-3:17-dione. Further single fractions from the chromatogram contain in smaller quantity $\Delta^5$-androstene-3$\beta$-ol-17-one.

Example 3

A solution of 20 gms. of the neutral portion, containing chiefly $\Delta^4$-androstene-3:17-dione and progesterone, obtained by the chromic acid oxidation of cholesteryl-acetate dibromide followed by debromination, hydrolysis and dehydrogenation by the method of Oppenauer, in 700 cc. of acetone is added to 40 liters of a culture of *Fusarium solani*, prepared according to Example 1, in a customary fermentor with stirring and aeration. After incubation and working up as described in Example 1, 5.2 gms. of $\Delta^{1:4}$ androstadiene-3:17-dione are obtained.

Example 4

To 4 liters of a culture of *Fusarium caucasicum*, prepared according to Example 1, there is added a solution of 1 gm. of $\Delta^{1:4}$-androstadiene-3:17-dione in 35 cc. of acetone. After incubation for 7 days, working up is carried out as described in Example 1 and the extract obtained is purified by chromatography. By recrystallization from acetone there is finally obtained about 60% of a new compound, 1:2-dehydro-testolactone of the formula

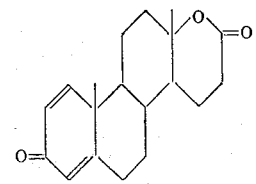

of melting point 219–220° C. and specific rotation $[\alpha]_D^{22} = -49 \pm 3°$ (c.=1.025 in chloroform). Ultraviolet spectrum: $\lambda$ max=242 m$\mu$; log $\epsilon$=4.23. Microanalysis: C=75.70, H=8.05%.

The same compound is obtained under the conditions of Example 1 from progesterone, $\Delta^5$-pregnene-3:20-dione, $\Delta^5$-pregnene-3$\beta$-ol-20-one, 11-desoxy-corticosterone or $\Delta^4$-androstene-3:17-dione, provided that incubation is carried out for 6–10 days instead of for 2 days.

Example 5

Three conical flasks each of 200 cc. capacity and each containing 50 cc. of the sterile nutrient solution described in Example 1 are inoculated with *Fusarium solani*, and agitated mechanically at 26° C. for 48 hours. To each culture is then added a solution of 10 mg. of allopregnane-3:20-dione in 0.5 cc. of acetone, and further agitated at 26° C. After 24 hours, 48 hours and after 7 days each culture is filtered and extracted as described in Example 1. The three extraction residues (1–3) are examined by paper chromatography. Extracts 1 and 2 contain androstane-3:17-dione, and $\Delta^{1:4}$-androstadiene-3:17-dione is present in extract 3.

By adding, instead of allopregnane-3:20-dione, an analogous solution of 3$\beta$-acetoxy-allopregnane-20-one, there is found in the extract likewise after incubation for 24 and 48 hours, androstane-3:17-dione and after incubation for 7 days $\Delta^{1:4}$-androstadiene-3:17-dione. By using in this example, instead of the allopregnane-3:20-dione, androstane-3:17-dione there is found in the extracts after 24 and 48 hours' incubation only unchanged starting material, and after incubation for 7 days $\Delta^{1:4}$-androstadiene-3:17-dione.

Example 6

4 liters of a so-called Czapek-Dox nutrient solution are equally divided in two agitating vessels, sterilized and inoculated with a culture of the fungus *Rhizopus suinus*. After being shaken for 2 days at 26° C. the fungus has developed well and a solution of 500 mg. of 11-desoxy-corticosterone in 15 cc. of acetone is added to each vessel under sterile conditions. Shaking is continued for a further 4 days at the above temperature followed by filtration from the mycelium. The culture filtrate is extracted as described in Example 1, the extract is washed, dried and evaporated. The reaction mixture (1.0 g.) is separated by the counter-current process. For this purpose the residue is dissolved in 50 cc. of absolute ethanol and 150 cc. of water and shaken with 200 cc. of benzene. The lower layer is separated off and passed through four more separating funnels each containing 200 cc. of benzene saturated with ethanol of 25 percent strength. This procedure is repeated 4 times each time with 200 cc. of ethanol of 25 percent strength saturated with benzene. The resulting 5 benzene phases and 5 aqueous alcohol phases are evaporated in vacuo. Examination by paperchromatography shows that in the aqueous alcoholic phases there are only few highly polar by-products present, whilst the first three benzene phases contain 650 mg. of a compound which is somewhat more highly polar than the starting material and possesses no reductive capacity. By crystallization from a mixture of acetone and petroleum ether there is obtained testolactone of the formula

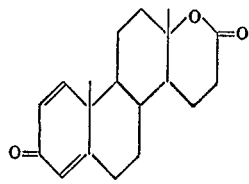

in the form of needles melting at 203–206° C. and having the specific rotation $[\alpha]_D = +40°$ (c.=1.065 in chloroform). Absorption bands in infrared at 5.81, 5.98 and 6.17$\mu$ (Nujol). Microanalysis: found—C, 75.26; H, 8.80%. Calculated for $C_{19}H_{26}O_3$:C, 75.46; H, 8.67%.

What is claimed is:

1. A process for the manufacture of steroidal oxidation products of steroids which comprises subjecting a member selected from the group consisting of androstane and pregnane compounds which contain in the 3-, 17- and 3-, 20-positions respectively a member selected from the group consisting of free and protected hydroxyl and oxo groups, to the action of a member selected from the group consisting of fungi of the species *Fusarium solani*, *Fusarium caucasicum* and *Rhizopus suinus* and the enzymes thereof, and isolating a member selected from the group consisting of testo-lactones and androstane compounds formed which contain in the 3- and 17-position a member selected from the group consisting of free and protected hydroxyl and oxo groups.

2. A process according to claim 1 wherein a fungus of the species *Fusarium solani* is used.

3. A process according to claim 1 wherein a fungus of the species *Fusarium caucasicum* is used.

4. A process according to claim 1 wherein a fungus of the species *Rhizopus suinus* is used.

5. A process which comprises the steps of subjecting progesterone to the action of the fungus *Fusarium solani* and isolating the resulting $\Delta^{1,4}$-androstadiene-3:17-dione.

6. A process according to claim 1, wherein the starting compound has a double bond extending from the 5-carbon atom.

7. A process according to claim 1, wherein the starting compound is progesterone.

8. A process according to claim 1, wherein the starting compound is $\Delta^5$-pregnene-3$\beta$-ol-20-one.

9. A process according to claim 1, wherein the starting compound is 11-desoxy-corticosterone.

10. A process according to claim 1, wherein the starting compound is $\Delta^4$-androstene-3:17-dione.

11. A process according to claim 1, wherein the starting compound is $\Delta^5$-androstene-3$\beta$-ol-17-one.

12. A process according to claim 1, wherein the starting compound is allopregnane-3:20-dione.

13. A process according to claim 1, wherein the starting compound is 3$\beta$-acetoxy-allopregnane-20-one.

14. A process according to claim 1, wherein the starting material is reacted for 1–2 days.

15. A process according to claim 1, wherein the starting material is reacted for 6–15 days.

16. A process according to claim 1, wherein $\Delta^{1,4}$-androstadiene-3:17-dione is separated and isolated from the reaction mixture.

17. A process according to claim 1, wherein 1:2-dehydro-testolactone is separated and isolated from the reaction mixture.

18. A process according to claim 1, wherein testolactone is separated and isolated from the reaction mixture.

19. A process according to claim 1, wherein the reaction is carried out under aerobic conditions.

References Cited in the file of this patent

UNITED STATES PATENTS

| | | |
|---|---|---|
| 2,480,246 | Jacobson et al. | Aug. 30, 1949 |
| 2,499,248 | Pincus et al | Feb. 28, 1950 |
| 2,602,769 | Murray et al. | July 8, 1952 |
| 2,658,023 | Shull et al. | Nov. 3, 1953 |
| 2,744,120 | Fried et al. | May 1, 1956 |

OTHER REFERENCES

Experientia, Vol. 9, No. 10 (1953) pp. 371–372.

UNITED STATES PATENT OFFICE
CERTIFICATE OF CORRECTION atent No. 2,904,472 September 15, 1959

Albert Wettstein et al.

It is hereby certified that error appears in the printed specification f the above numbered patent requiring correction and that the said Letters atent should read as corrected below.

Column 5, lines 20 to 28, the formula should appear as shown below nstead of as in the patent:

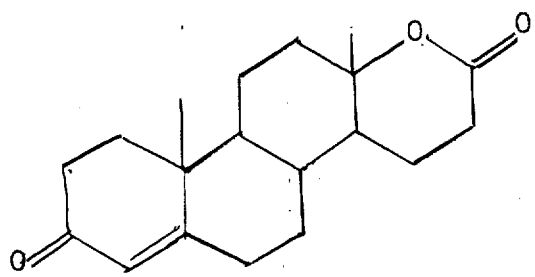

Signed and sealed this 10th day of May 1960.

(SEAL)
Attest:
KARL H. AXLINE
Attesting Officer

ROBERT C. WATSON
Commissioner of Patents